United States Patent
Costin

(10) Patent No.: US 6,664,204 B1
(45) Date of Patent: Dec. 16, 2003

(54) SOLAR INHIBITING GLASSES WITH INCREASED REDOX AND IRON

(75) Inventor: Darryl J. Costin, Westlake Village, CA (US)

(73) Assignee: High Performance Glass Innovations, Toledo, OH (US)

( * ) Notice: Subject to any disclaimer, the term of this patent is extended or adjusted under 35 U.S.C. 154(b) by 0 days.

(21) Appl. No.: 09/682,259

(22) Filed: Aug. 10, 2001

Related U.S. Application Data

(60) Provisional application No. 60/225,867, filed on Aug. 15, 2000.

(51) Int. Cl.⁷ .............................................. C03C 3/083
(52) U.S. Cl. .......................................... 501/70; 501/71
(58) Field of Search ...................... 501/70, 71

(56) References Cited

U.S. PATENT DOCUMENTS

| | | | | |
|---|---|---|---|---|
| 4,792,536 A | * | 12/1988 | Pecoraro et al. ............... | 501/70 |
| 5,030,594 A | * | 7/1991 | Heithoff ....................... | 501/72 |
| 5,112,778 A | * | 5/1992 | Cheng et al. .................. | 501/70 |
| 5,362,689 A | * | 11/1994 | Morimoto et al. ............. | 501/70 |
| 5,372,977 A | * | 12/1994 | Mazon-Ramos et al. ...... | 501/70 |
| 5,830,812 A | * | 11/1998 | Shelestak et al. ............. | 501/71 |
| 5,837,629 A | * | 11/1998 | Combes et al. ............... | 501/70 |
| 6,313,053 B1 | * | 11/2001 | Shelestak ..................... | 501/71 |

* cited by examiner

*Primary Examiner*—Karl Group
(74) *Attorney, Agent, or Firm*—Scott C. Harris, Esq.

(57) ABSTRACT

A special glass formed by maintaining a high redox ratio, and a large amount of total iron. The redox is preferably maintained at greater than 50 percent, more preferably greater than 80 percent. The total iron is maintained at least that 0.5 percent, and more preferably at 0.8 percent or greater.

8 Claims, No Drawings

SOLAR INHIBITING GLASSES WITH INCREASED REDOX AND IRON

CROSS REFERENCE TO RELATED APPLICATIONS

The present application claims priority from Provisional Application No. 60/225,867, filed Aug. 15, 2000.

BACKGROUND OF INVENTION

Glass used in automobiles, trucks, houses and commercial buildings have different requirements for visible transmissions. For example, the specification for visible transmission for cars is 70% in the United States, whereas the visible transmission for glass used in trucks and vans behind the driver (or B pillar) is typically 20–30%. The visible transmission for glass used in houses is about 75–80% and the visible transmission for glass used in buildings is generally from 20–40%.

It is often desirable to reduce the solar transmission for the glass used in each application. Glasses with reduced solar transmission used in autos and trucks may provide improved passenger comfort, reduced air conditioning loads and thus improved economy. This can also reduce sun damage to seating and interior components of the vehicles. Likewise, glasses with reduced solar transmission used in houses and buildings provide for reduced energy costs associated with air conditioning and reduced degradation of draperies and furniture.

Hence, for these applications, it may be desirable to reduce the solar transmission in glass.

Solar transmission can be adjusted by altering the chemistry of the glass. Alternately, the transmission characteristic of the glass can be altered by coating the glass with a material having specified pass characteristics. This latter technique can be done via chemical vapor deposition or physical vapor deposition coatings on the glass.

The prior art has found limited success with the first technique. For example, the best commercially available glass for autos has a solar transmission of about 40% and the best commercially available glass for trucks and vans (behind the B pillar) is about 23%.

Coatings, on the other hand, can often double or triple the cost of the glass product.

SUMMARY OF INVENTION

The present invention describes a new glass formulation and material which maximizes redox potential.

DETAILED DESCRIPTION

Glass is often used to allow visible transmission. The requirements for visual transmission may limit the ability to reduce the solar transmission since a significant amount of the solar energy may lie in the visible spectrum.

Mathematical models of the relationship between the visible and solar transmission of the glass and the elemental and compound constituents in the glass were used according to this system. These models also accounted for interactive effects between the various compounds in the glass batch. Multiple correlation analysis is used to develop models which accounts for the impact of interactive effects of the glass compounds on the solar and visible transmission of glass.

The inventor strongly believes that the reason for the relatively high solar transmission of the best commercially available glasses is that in the development of the composition, interactive effects among the various compounds in the glass have not been taken in consideration. Yet it is precisely these interactive effects that most likely have the most influence on reducing solar transmission in glasses at a fixed visible transmission.

Specific materials were investigated. Two particularly important materials are FeO and $Fe_2O_3$ and the interactive relationship therebetween. The inventor believes that a key interactive effect is the ratio of $FeO/Fe_2O_3$. This relationship between FeO and $Fe_2O_3$ is called "redox potential". The present application described controlling the relationship between redox potential and the total iron ($Fe_2O_3$) content of glass.

Reducing conditions and additions of carbon or SnO are standard methods to reduce the iron ($Fe_2O_3$) to FeO. Therefore, generally, more SnO is added to the batch to convert more of the iron to FeO. Table I shows exemplary results. Solar transmission is reduced when both the total iron and the redox potential are maximized. The interaction of redox potential with total iron content is crucially important to produce the advantageous effects of reduced solar transmission.

TABLE 1

Relative Solar Transmission for Glasses
Redox Potential vs. Total Iron

| Redox Potential | Total Iron Content | | |
|---|---|---|---|
| High | Medium | Low | Lowest |
| Medium | Medium | Medium | Low |
| Low | Highest | High | High |
| | Low | Medium | High |

It is known in the art that the FeO compound absorbs the near infrared. However, FeO by itself does not obtain the significant advantages that are obtained herein by the specific combination of FeO and $Fe_2O_3$. Specifying general ranges of these constituents can produce a wide range of glasses with different solar and visible transmissions. Whatever chemical modifications are required to achieve the desired color and visible transmission, both the total iron content and redox potential must be together maximized to achieve the minimum solar transmission. Of course, increasing both these terms may decrease the visible transmission. Hence, the maximization of redox potential and total iron content must be balanced with the need to achieve specific levels of visible transmission for the various glass products. Computer designed experiments coupled with multiple correlation analysis are particularly useful techniques to optimally balance such variables. It was surprisingly discovered that an industry breakthrough could be achieved for truck and van glass simply by maximizing the redox potential and total iron content while maintaining a visible transmission between 15–27%. One of the best commercially available glasses used in vans and trucks is PPG's GL-20 glass with a visible transmission of about 24% and corresponding solar transmission of about 23% for 3.3 mm glass. By maximizing the redox potential in excess of 80% (with SnO contents of about 3%) and total iron content of about 0.8%, two glasses were developed with much further reduced solar transmission. The first glass with a visible transmission of 15.3% and a solar transmission of 6.4% had a total iron content of 0.813% and a redox potential of 84.9%. The second glass with a visible transmission of 27.0% had a solar transmission of 8.4% and a corresponding total iron content of 0.810% and redox potential of 84.2%. These glasses may be better than other known glasses. Similarly, a glass was developed for commercial buildings with a visible transmission of 41.8% and a solar transmission of 16.5%. This glass had a total iron content of 0.707% with a redox potential of 82.1%. This glass would also be a clear breakthrough in the field in reducing solar transmission without the use of expensive coatings. Those skilled in the art will recognize that similar and significant reductions in the solar transmission of glass used for autos, trucks, houses and buildings can be obtained by the techniques disclosed in this invention maximizing the total iron content and redox potential for a fixed visible transmission glass. Those skilled in the art will also recognize that there are several other elements and compounds that could be added to the glass (beyond the compounds $FeO$, $Fe_2O_3$ and $SnO$ disclosed here) to achieve a variety of different effects. Such effects include color changes, ease of meltability, viscosity enhancement, etc. Those skilled in the art will also recognize that there are ways to achieve the specified range of redox potential, other than the use of SnO. Other embodiments are within the disclosed embodiment.

What is claimed is:

1. A glass composition, comprising:
   a glass base material; and
   an iron dopant, added to said glass base material in an amount in which a molar fraction of total iron present in its ferrous state, expressed as a ratio to total iron, is at least 80 percent and a total iron added to said glass is at least 0.7% by weight.

2. The glass composition as in claim 1, further comprising at least one other dopant added to said glass base material.

3. A glass composition as in claim 1, wherein said molar fraction is around 85 percent.

4. A glass composition as in claim 1, wherein said total iron is at least 0.8% by weight.

5. A glass composition as in claim 1, further comprising approximately three percent by weight of SnO.

6. A glass composition with total iron content greater than 0.7% and a ratio of ferrous iron to total iron is greater than 80%.

7. A method, comprising:
   forming a glass material with iron content therein;
   reducing at least some of said iron content to a state of FeO; and
   maintaining a ratio between $FeO$ and $Fe_2O_3$ at a value greater than 80 percent, and maintaining an amount of total iron at value greater than 0.7 percent by weight.

8. A method as in claim 7, wherein said reducing comprises adding SnO as a reducing agent.

* * * * *